US011954932B2

United States Patent
Lee et al.

(10) Patent No.: US 11,954,932 B2
(45) Date of Patent: Apr. 9, 2024

(54) SYSTEMS AND METHODS FOR AUTOMATIC DETECTION OF FEATURES ON A SHEET

(71) Applicant: Bluebeam, Inc., Pasadena, CA (US)

(72) Inventors: Jae Min Lee, Fullerton, CA (US); Joseph W. Wezorek, Pasadena, CA (US)

(73) Assignee: Bluebeam, Inc., Pasadena, CA (US)

( * ) Notice: Subject to any disclaimer, the term of this patent is extended or adjusted under 35 U.S.C. 154(b) by 555 days.

(21) Appl. No.: 17/177,072

(22) Filed: Feb. 16, 2021

(65) Prior Publication Data

US 2022/0121844 A1 Apr. 21, 2022

Related U.S. Application Data

(60) Provisional application No. 63/093,031, filed on Oct. 16, 2020.

(51) Int. Cl.
| | |
|---|---|
| G06V 30/414 | (2022.01) |
| G06F 18/22 | (2023.01) |
| G06F 40/279 | (2020.01) |
| G06N 20/00 | (2019.01) |
| G06V 10/10 | (2022.01) |

(52) U.S. Cl.
CPC ............ *G06V 30/414* (2022.01); *G06F 18/22* (2023.01); *G06F 40/279* (2020.01); *G06N 20/00* (2019.01); *G06V 10/10* (2022.01); *G06V 10/16* (2022.01)

(58) Field of Classification Search
CPC ...... G06V 30/414; G06V 10/10; G06V 10/16; G06F 18/22; G06F 40/279; G06F 18/24323; G06F 40/106; G06N 20/00
See application file for complete search history.

(56) References Cited

U.S. PATENT DOCUMENTS

| | | | | |
|---|---|---|---|---|
| 10,572,725 | B1* | 2/2020 | Becker | G06F 18/2413 |
| 11,151,737 | B1* | 10/2021 | Li | G06T 7/55 |
| 11,257,006 | B1* | 2/2022 | Anschel | G06N 20/00 |
| 11,521,301 | B2* | 12/2022 | Klaiman | G06T 5/001 |
| 2004/0177089 | A1* | 9/2004 | Love | G06F 16/56 |

(Continued)

OTHER PUBLICATIONS

International Search Report dated Jan. 24, 2022, in counterpart International Patent Application No. PCT/US21/55037 (13 pages, in English).

*Primary Examiner* — Xuemei G Chen

(74) *Attorney, Agent, or Firm* — Bookoff McAndrews, PLLC

(57) ABSTRACT

A computer-implemented method for detecting a target object on a document page that includes detecting a sample target area on a sample document page, generating an image by overlapping a plurality of sample document pages with one another, and detecting one or more cells within the sample target area on the image. The sample target area includes a sample target object. The method further includes extracting one or more informational features from each of the one or more cells. The one or more informational features define characteristics of a corresponding cell of the one or more cells. A machine learning model is trained using the one or more informational features extracted from each of the one or more cells, to detect the sample target object. A target object on a document page is detected using the trained machine learning model.

17 Claims, 9 Drawing Sheets

(56) References Cited

U.S. PATENT DOCUMENTS

| | | | |
|---|---|---|---|
| 2006/0126095 A1* | 6/2006 | Tamura | H04N 1/00838 358/1.14 |
| 2007/0058865 A1 | 3/2007 | Li et al. | |
| 2008/0025568 A1 | 1/2008 | Han et al. | |
| 2011/0282897 A1* | 11/2011 | Li | G06V 10/771 707/769 |
| 2015/0170002 A1 | 6/2015 | Szegedy et al. | |
| 2015/0220520 A1* | 8/2015 | Hartmann | G06F 40/205 707/742 |
| 2016/0104077 A1* | 4/2016 | Jackson, Jr. | G06N 20/00 706/12 |
| 2016/0174902 A1 | 6/2016 | Georgescu et al. | |
| 2017/0270653 A1* | 9/2017 | Garnavi | G06N 5/01 |
| 2018/0032840 A1* | 2/2018 | Yu | G06V 10/774 |
| 2019/0102617 A1* | 4/2019 | Dorogoy | G06F 18/24147 |
| 2019/0205606 A1 | 7/2019 | Zhou et al. | |
| 2019/0266394 A1* | 8/2019 | Yu | G06V 30/413 |
| 2020/0012879 A1* | 1/2020 | Wang | G06V 30/413 |
| 2020/0160050 A1* | 5/2020 | Bhotika | G06V 30/414 |
| 2020/0175267 A1* | 6/2020 | Schäfer | G06V 30/413 |
| 2020/0279374 A1* | 9/2020 | King | G06V 10/50 |
| 2020/0293796 A1* | 9/2020 | Sajjadi Mohammadabadi | G06V 10/751 |
| 2020/0311903 A1* | 10/2020 | Tsutsumi | G06T 7/0002 |
| 2021/0049381 A1* | 2/2021 | Ju | B60W 30/095 |
| 2021/0064865 A1* | 3/2021 | Rimchala | G06V 10/44 |
| 2021/0110194 A1* | 4/2021 | Yao | G06V 30/413 |
| 2021/0201018 A1* | 7/2021 | Patel | G06Q 30/0201 |
| 2021/0240975 A1* | 8/2021 | Sundell | G06F 18/24 |
| 2021/0248420 A1* | 8/2021 | Zhong | G06V 10/82 |
| 2021/0256097 A1* | 8/2021 | Jayaraman | G06N 5/022 |
| 2021/0263975 A1* | 8/2021 | Kim | G06F 16/9574 |
| 2021/0312232 A1* | 10/2021 | Tensmeyer | G06F 18/2148 |
| 2021/0368064 A1* | 11/2021 | Aggarwal | G06F 40/103 |
| 2021/0390296 A1* | 12/2021 | En | G06N 3/045 |
| 2022/0051055 A1* | 2/2022 | Sakuma | G06F 18/25 |
| 2022/0171891 A1* | 6/2022 | Sinha | G06N 5/022 |
| 2022/0262035 A1* | 8/2022 | Liu | G06T 7/0002 |
| 2022/0319217 A1* | 10/2022 | Paliwal | G06V 30/414 |

\* cited by examiner

SYSTEMS AND METHODS FOR AUTOMATIC DETECTION OF FEATURES ON A SHEET

CROSS-REFERENCE TO RELATED APPLICATION(S)

This patent application claims the benefit of priority to U.S. Provisional Application No. 63/093,031, filed on Oct. 16, 2020, the entirety of which is incorporated herein by reference.

TECHNICAL FIELD

The present disclosure relates to systems and methods for automatically detecting features on a sheet. More particularly, the present disclosure relates to systems and methods for automatically determining a location and content of certain features on a drawing sheet that are unique to the particular drawing.

BACKGROUND

Architecture, engineering, and construction (AEC) industries actively use drawings to represent building designs. A large number of drawing sheets are usually needed to represent various aspects of a building. Drawing sheets typically include a title box or similar section containing information used for identifying a particular drawing, which may be important to discern the context of the drawing depicted on the sheet. For example, the title box of a drawing sheet may include a title and a number, which may be indicative of the content displayed on the drawing sheet.

Despite drawings having a general format for sheet titles and sheet numbers, there remains a lack of a fixed or standard format for these features in AEC industries. As a result, each originator of a drawing may provide varying custom formats, thereby resulting in a large amount of variation across the industry. This variation may cause the automatic detection of the sheet title and sheet number challenging. As such, despite the prevalence of digital representation of drawings, the detection of sheet titles and sheet numbers generally depends on manual methods.

The background description provided herein is for the purpose of generally presenting the context of this disclosure. Unless otherwise indicated herein, the materials described in this section are not prior art to the claims in this application and are not admitted to be prior art, or suggestions of the prior art, by inclusion in this section.

SUMMARY OF THE DISCLOSURE

One embodiment provides a computer-implemented method for detecting a target object on a document page, the method comprising: detecting a sample target area on a sample document page; generating an image by overlapping a plurality of sample document pages with one another; detecting one or more cells within the sample target area on the image, wherein the sample target area includes a sample target object; extracting one or more informational features from each of the one or more cells, wherein the one or more informational features define characteristics of a corresponding cell of the one or more cells; training a machine learning model, using the one or more informational features extracted from each of the one or more cells, to detect the sample target object; and detecting the target object on the document page using the trained machine learning model.

Another embodiment provides a system for detecting a target object on a document page, comprising: one or more processors; and at least one non-transitory computer readable medium storing instructions which, when executed by the one or more processors, cause the one or more processors to perform operations comprising: detecting a sample target area on a sample document page; generating an image by overlapping a plurality of sample document pages with one another; detecting one or more cells within the sample target area on the image, wherein the sample target area includes a sample target object; extracting one or more informational features from each of the one or more cells, wherein the one or more informational features define characteristics of a corresponding cell of the one or more cells; training a machine learning model, using the one or more informational features extracted from each of the one or more cells, to detect the sample target object; and detecting the target object on the document page using the trained machine learning model.

Another embodiment provides at least one non-transitory computer readable medium for automatically detecting a target object on a document page, the at least one non-transitory computer readable medium storing instructions which, when executed by one or more processors, cause the one or more processors to perform operations comprising: detecting a sample target area on a sample document page; generating an image by overlapping a plurality of sample document pages with one another; detecting one or more cells within the sample target area on the image, wherein the sample target area includes a sample target object; extracting one or more informational features from each of the one or more cells, wherein the one or more informational features define characteristics of a corresponding cell of the one or more cells; training a machine learning model, using the one or more informational features extracted from each of the one or more cells, to detect the sample target object; and detecting the target object on the document page using the trained machine learning model.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
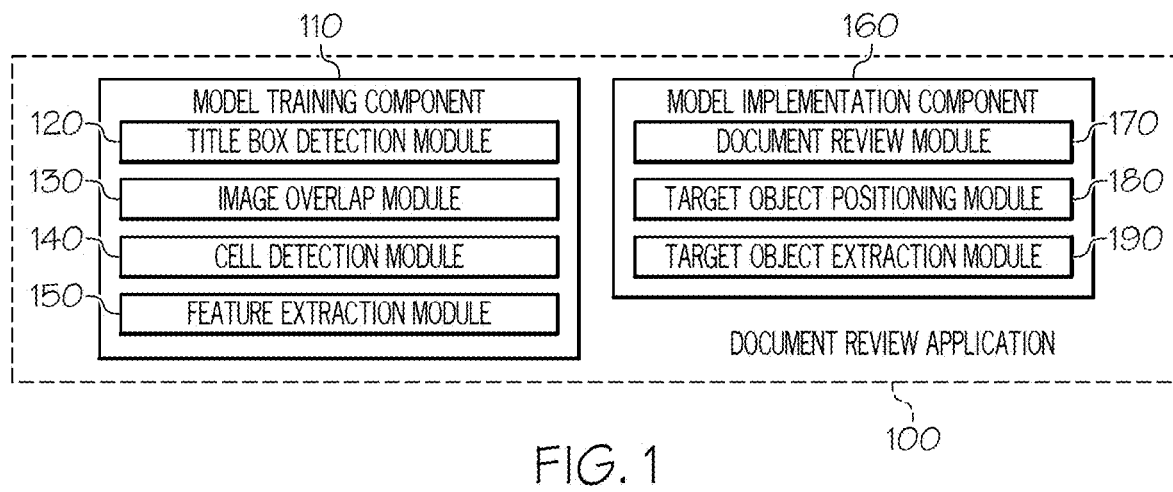
FIG. 1 shows a block diagram of an exemplary document review application, according to one aspect of the present disclosure.

The following embodiments describe systems and methods for automatically detecting features on drawings, and more particularly, for automatically determining a location and content of certain features of a drawing.

In the AEC industry, the sheet title and sheet number are key elements of a drawing that may facilitate an identification of the drawing's content. Further, the title and number of a drawing may associate the drawing sheet with other drawing sheets of a drawing plan set. By way of example, the number of drawings in a plan set may range from tens to thousands of sheets. Accordingly, the sheet title and sheet number of a drawing may facilitate the management of the numerous drawings in a drawing plan set.

The sheet title and sheet number may provide information and service multiple functions, including content identification, version control, drawing classification, referencing, and drawing overlay. The sheet title and sheet number may define the content depicted on a particular drawing sheet such that the title and number may vary relative to each drawing. The sheet title may include textual information indicating a name of the drawing, and the sheet number may include a unique identifier of the drawing for purposes of reference relative to the other drawing sheets. In some instances, the sheet title may include additional information providing further context to the drawing, such as a building discipline (e.g., Architectural, Structural, etc.), a drawing type (e.g., floor plan, etc.), and/or a depicted level of a building (e.g., first level, second level, etc.), and the like. In further instances, the sheet number may include information providing context to the drawing, such as a symbol indicative of a drawing discipline (e.g., an "A" for architectural drawings, an "S" for structural drawings, etc.), and the like.

Currently, identification of a title and number of a drawing is performed manually by, for example, determining the content of the title and number after establishing a location of the title box on the drawing sheet. The manual process may be tedious and time-consuming, especially when there are a large number of drawings to be reviewed in a plan set. Further, AEC drawings may employ varying formats for the size, shape, position, boundary, orientation, scale, and location of the title box along a drawing sheet. Locating the sheet title and sheet number, and determining the information contained in each, from drawings of varying formats may be more complicated given the variability across the industry.

Therefore, there is a need for systems and methods enabling more effective and expeditious detection of such features on a drawing. Further, there is a need for systems and methods enabling automatic detection between drawings having varying formats, such as the size, shape, position, boundary, orientation, scale, and/or location of the title box.

The present disclosure concerns systems and methods for automatically detecting features on drawings having varying title box formats. In one embodiment, a target area on a drawing sheet may be detected and an image may be generated by overlapping a plurality of drawing sheets with one another. One or more cells within the target area on the sheet may be detected from the generated image, with the target area including a target object. One or more informational features included in each of the one or more cells may be extracted, and the one or more informational features may define certain characteristics of a corresponding cell of the cells located within the target area. A machine learning model may be trained using the one or more informational features extracted from each of the one or more cells to detect the target object, and the target object may be detected on a second sheet using the trained machine learning model.

The subject matter of the present disclosure will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. It should also be noted that all numeric values disclosed herein may have a variation of ±10% (unless a different variation is specified) from the disclosed numeric value. Further, all relative terms such as "about," "substantially," "approximately," etc. are used to indicate a possible variation of ±10% (unless noted otherwise or another variation is specified).

Referring now to the appended drawings, FIG. 1 shows a block diagram of an exemplary document review application 100, according to one aspect of the present disclosure. The document review application 100 may be installed on a computing device consistent with or similar to that depicted in FIG. 7. In general, the document review application 100 may comprise a model training component 110 and a model implementation component 160.

The model training component 110 may include one or more subcomponents, such as, for example, a title box detection module 120, an image overlap module 130, a cell detection module 140, and a feature extraction module 150. The model training component 110 may be configured to detect a location of a title box on a sample target document via the title box detection module 120, generate an overlap image of a plurality of sample documents from a document set via the image overlap module 130, detect one or more cells in the title box of the overlap image via the cell detection module 140, and extract informational features from one or more cells via the feature extraction module 150. The model training component 110 may train a machine learning model to identify a target object (e.g., a cell including a sheet title or number) in the title box using the extracted informational features. The sample target documents reviewed by the model training component 110 may include, but may not be limited to, architectural drawings, engineering drawings, and construction drawings (i.e., documents frequently used in the AEC industry). In other embodiments, the model training component 110 may review digital files, such that the sample target documents may include, but may not be limited to, Portable Document Format (PDF) files, Building Information Modeling (BIM) files, word processing files, Computer-Aided Design (CAD) drawing files, image files, and more.

The model implementation component 160 may include one or more subcomponents, such as, for example, a document review module 170, a target object positioning module 180, and a target object extraction module 190. The model implementation component 160 may use the machine learning model trained by the model training component 110 to detect a target object in a target document. To that end, the model implementation component 160 may be configured to review the contents of a target document via the document review module 170, detect one or more cells on the target document via the target object positioning module 180, and extract one or more features from the one or more cells on the target document via the target object extraction module 190. The features extracted from the cells of the target document are provided to the machine learning model to detect a target object. The target object(s) in the document identified by the model implementation component 160 may include, but may not be limited to, one or more sheet titles and sheet numbers of a drawing.

Figure 2:
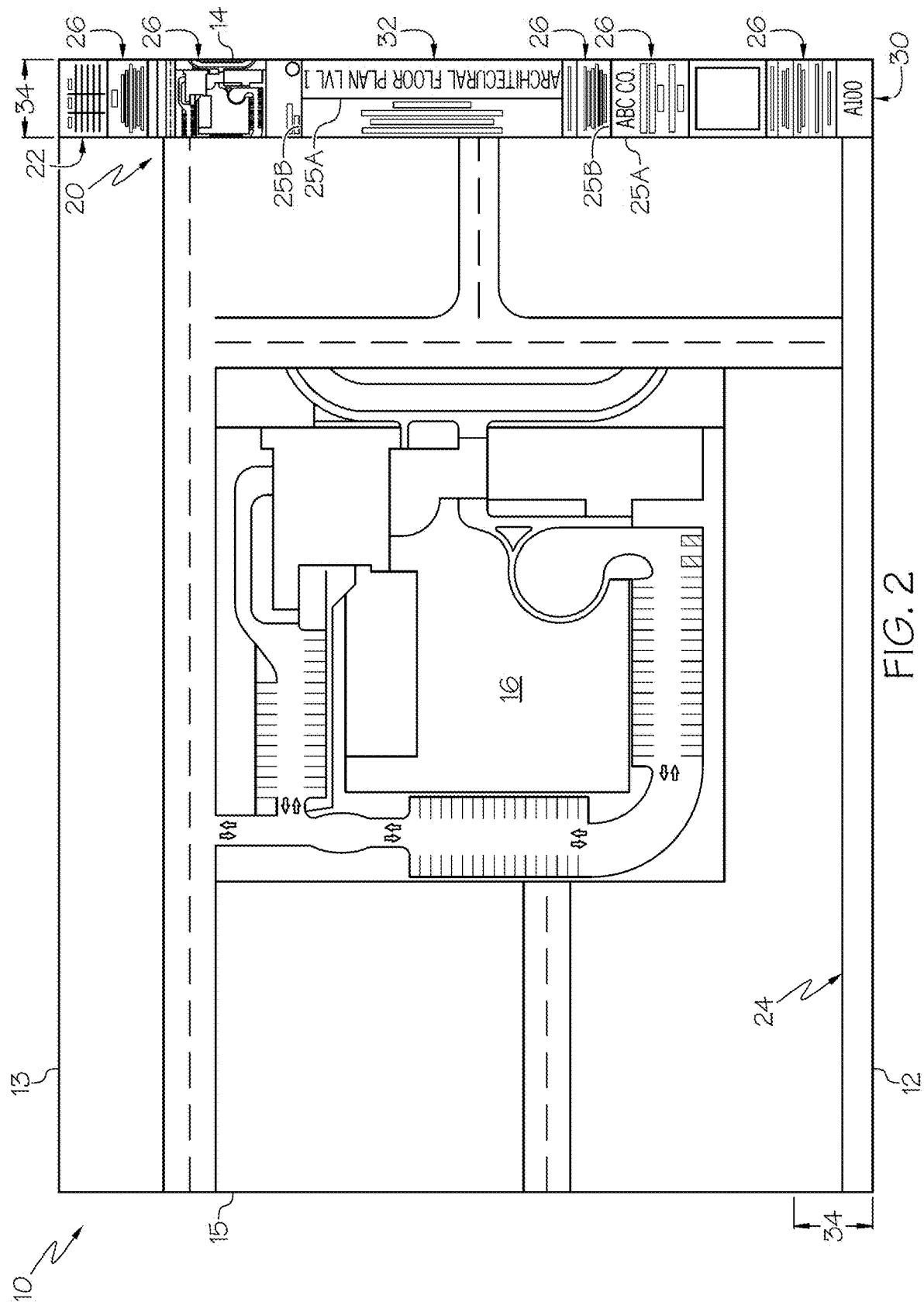
FIG. 2 shows an exemplary drawing sheet including a title box, according to one aspect of the present disclosure.

FIG. 2 illustrates an example target document including a drawing sheet 10 depicting one or more architectural, engineering, and/or construction contents. It should be understood that the drawing sheet 10 (i.e., a document page 10) may be one of a plurality of drawing sheets 10 included in a drawing set. The drawing sheet 10 may be defined by one or more terminal sides or edges, such as, for example, a bottom terminal side 12, a top terminal side 13, a right terminal side 14, and a left terminal side 15. The bottom terminal side 12, top terminal side 13, right terminal side 14, and left terminal side 15 may collectively define a center region 16 of the drawing sheet 10 where drawing content may be displayed. It should be appreciated that the content displayed in center region 16 of each drawing sheet 10 in a drawing set may vary relative to one another.

It should be understood that the drawing sheet 10 may represent a two-dimensional planar surface defined between the terminal sides, and have a surface area that includes a plurality of pixel locations (not shown) across the planar surface. The plurality of pixel locations may be oriented in accordance with a Cartesian coordinate system (e.g., numerical x-coordinates and y-coordinates), such that each pixel location specifies a physical spatial point along a plane of the drawing sheet 10. Each of the plurality of pixel locations along the drawing sheet 10 (e.g., on central region 16) may include an intensity value representing a visual resolution at said pixel location. Stated differently, the intensity value at each pixel location may be indicative of the presence, or lack thereof, of a pigment (e.g., ink, dye, paste, and other mediums) printed at said pixel location. In some embodiments, a pixel location may include an intensity value of approximately one when the drawing sheet 10 includes pigment at the pixel location, and an intensity level of approximately zero when the drawing sheet 10 does not include pigment at the pixel location.

In some embodiments, the drawing sheet 10 may include a title box 20 positioned along at least one of the terminal sides. In the example, the title box 20 (referred to herein as a "target area") is located adjacent to the right terminal side 14, however, it should be appreciated that the title box 20 may be located along various other terminal sides of the drawing sheet 10. The title box 20 may be defined by at least one of the terminal sides (e.g., the right terminal side 14) and at least one long vertical line 22 and/or long horizontal line 24. The long vertical line 22 and/or long horizontal line 24 may have a longitudinal length that is substantially similar to a length of the at least one terminal side defining the title box 20. As described in further detail herein, the at least one long vertical line 22 and/or long horizontal line 24 defining the title box 20 may be positioned within a predefined distance 34 from the at least one terminal side defining the title box 20.

In the example of FIG. 2, the title box 20 is defined by a long vertical line 22 positioned adjacent to the right terminal side 14, and within the predefined distance 34 from the right terminal side 14. The long vertical line 22 and the long horizontal line 24 may be longer than one or more other lines (e.g., short vertical lines 25A, short horizontal lines 25B, etc.) on the drawing sheet 10. It should be understood that a location of the title box 20 may generally vary between drawing sheets 10 of different drawing sets, and may be generally positioned at a similar location between drawing sheets 10 of the same drawing set.

Still referring to FIG. 2, the title box 20 may include a plurality of cells 26 located between the right terminal side 14 and the long vertical line 22. Each of the plurality of cells 26 may be defined by one or more short vertical lines 25A and one or more short horizontal lines 25B positioned between the right terminal side 14 and the long vertical line 22. The one or more short horizontal lines 25B may have a smaller longitudinal length relative to the long horizontal line 24, and the one or more short vertical lines 25A may have a smaller longitudinal length relative to the long vertical line 22. The short vertical lines 25A and short horizontal lines 25B may intersect with one another at one or more junction points to define an enclosed boundary of the plurality of cells 26. In some embodiments, the short vertical lines 25A and/or short horizontal lines 25B may intersect (and/or overlap) with the long vertical line 22 and/or long horizontal line 24 at one or more juncture points to define the enclosed boundary of one or more cells 26.

Each of the plurality of cells 26 may comprise a space within the title box 20 with information 28 relating to, describing, identifying, and/or associated with the drawing sheet 10, such as the contents displayed on the central region 16. It should be appreciated that the plurality of cells 26 may include information 28 in various suitable formats, such as, for example, textual characters, graphical illustrations, and more. In some embodiments, at least one of the plurality of cells may include a first target cell 30 including a sheet number of the drawing sheet 10, and a second target cell 32 including a sheet title of the drawing sheet 10 (collectively referred to herein as "target objects"). It should be understood that a location of the first target cell 30 and/or the second target cell 32 may generally vary between drawing sheets 10 of different drawing sets, and may be generally positioned at a similar location between drawing sheets 10 of the same drawing set.

The document review application 100 may be configured and operable to determine a pixel overlap count for each pixel in the plurality of cells 26, first target cells 30, and second target cells 32 in the drawing sheets 10 of a drawing set. The information 28 included in each of the plurality of cells 26 may generally be similar to one another across a plurality of drawing sheets 10 in the same drawing set. Further, the information 28 included in the first target cell 30 (e.g., the sheet number) and the second target cell 32 (e.g., the sheet title) may generally vary relative to one another across a plurality of drawing sheets 10 in a single drawing set.

Figure 3A:
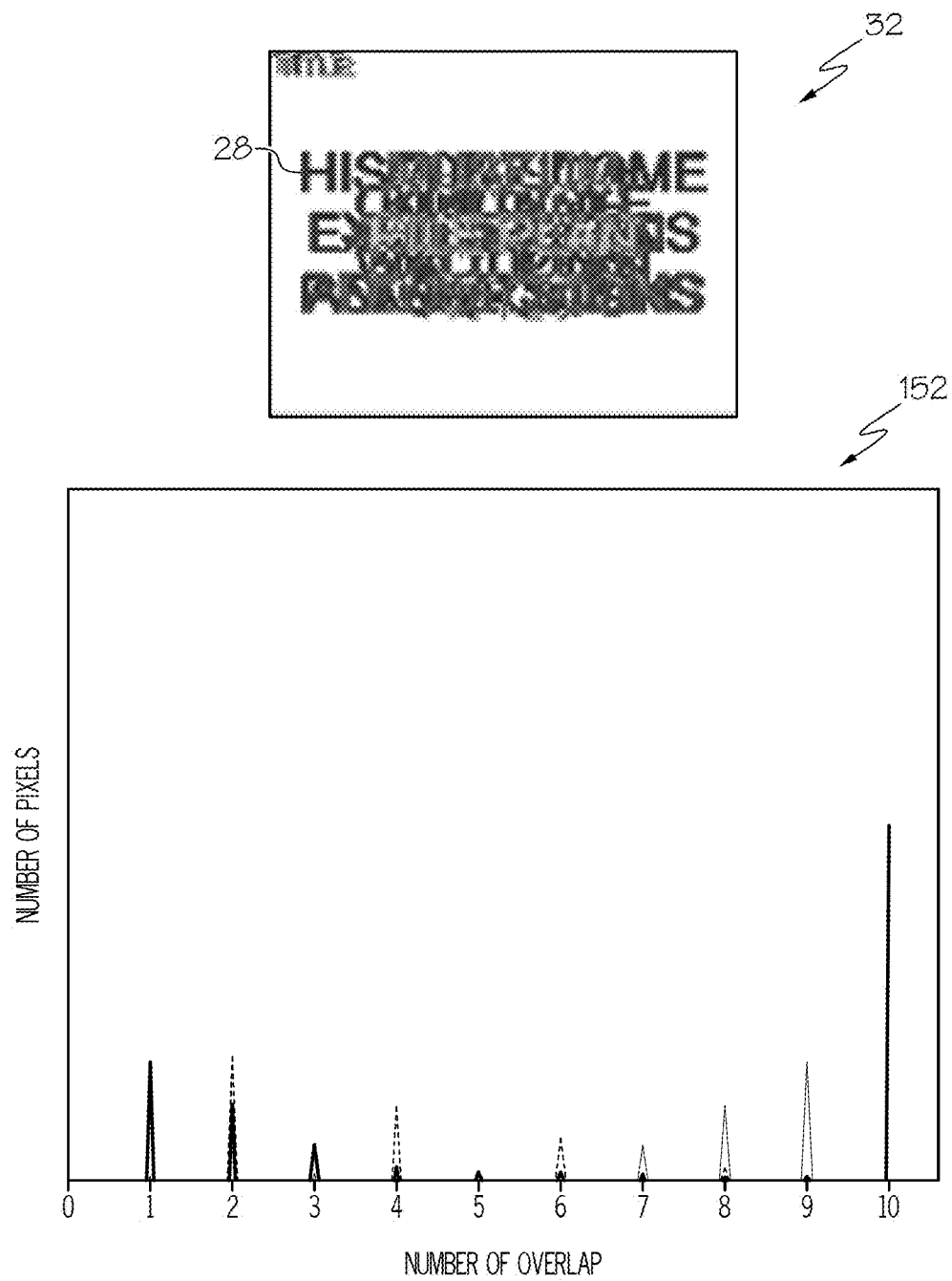
FIGS. 3A-3B show a graphical representation of a pixel overlap count for cells in the title box of the drawing sheet of FIG. 2, according to one aspect of the present disclosure.
Figure 3B:
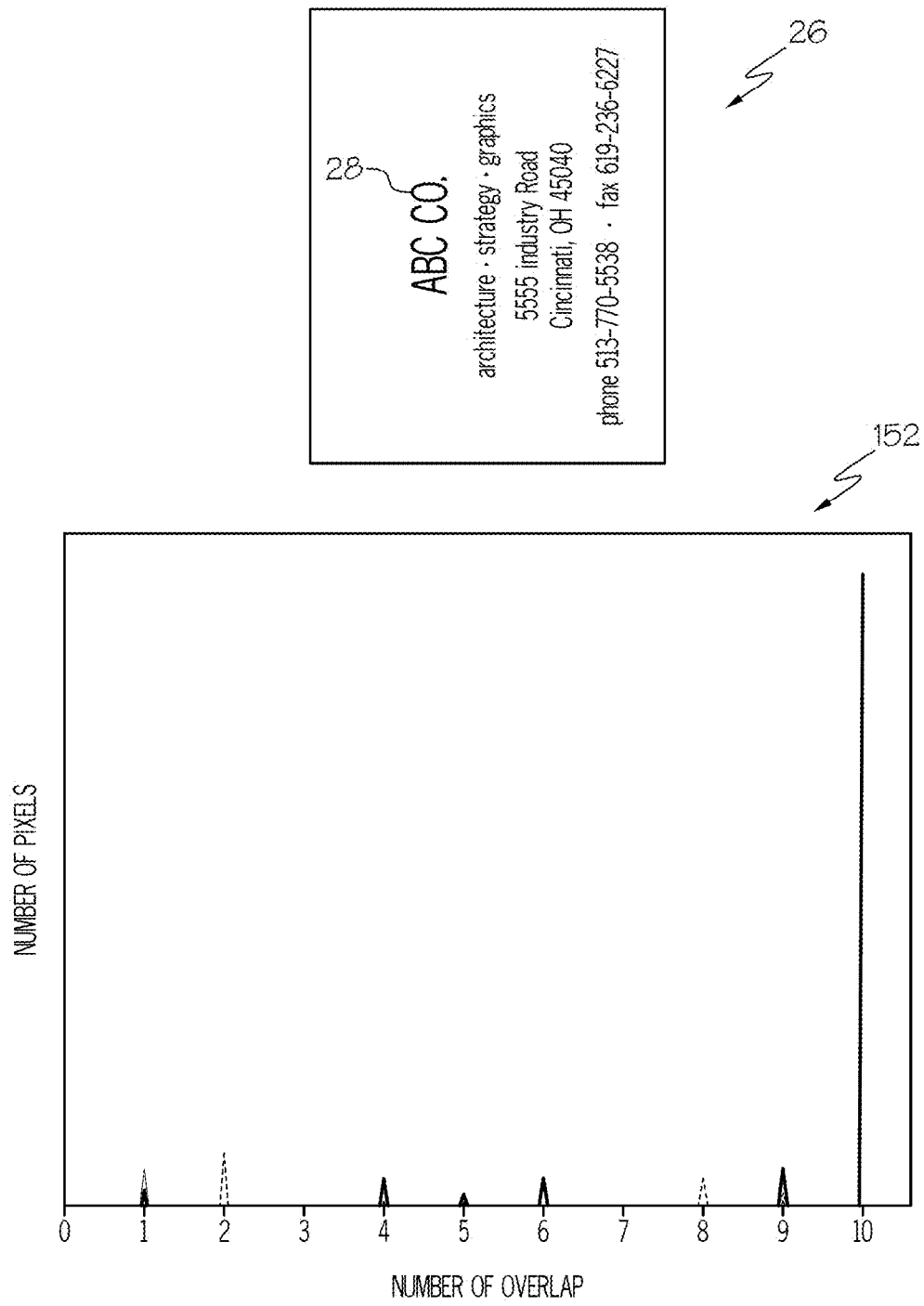

For example, FIGS. 3A-3B illustrate a visual depiction of the information 28 contained across a plurality of drawing sheets 10 in a drawing set at the second target cell 32 and one of the plurality of cells 26. Stated differently, the information 28 included in the second target cell 32 and one of the plurality of cells 26 from a plurality of drawing sheets 10 in a drawing set is schematically depicted, with the information 28 from each drawing sheet 10 overlapping with one another, respectively. As described in further detail herein, the model training component 110 may be configured to generate an overlap image of the plurality of cells 26 and target cells 30, 32 from the plurality of drawing sheets 10 in a drawing set, thereby depicting a comprehensive visual representation of the information 28 included in each cell relative to one another in the overlap image.

FIGS. 3A-3B further illustrate a respective graphical representation for each of the visual depictions of the second target cell 32 and the cell 26. In the example, the graphical representations depict a plurality of categories defining a pixel overlap count measured in each of the second target cell 32 and the cell 26. The pixel overlap count may include a numerical value corresponding to a number of pixels with a color (e.g., a non-white color) in the same position across the drawing sheets 10 of a drawing set. In other words, the pixel overlap count may include a numerical value corresponding to a quantity of pixel locations that have an identical intensity value across the drawing sheets 10 in a drawing set. For example, a white color pixel for a pixel location may represent an empty area across multiple drawing sheets 10 in a drawing set, and may correspond to a "zero" pixel overlap count. In another example, where two drawing sheets 10 are overlapped with each other, a pixel in an "x" and "y" coordinate could have a pixel overlap count from zero to two. In this instance, a zero pixel overlap count may signify there is no pixel with non-white color in the "x" and "y" coordinate between the two overlapping drawing sheets 10. A pixel overlap count of one may signify there is one pixel with non-white color in the "x" and "y" coordinate across the two drawing sheets 10. A pixel overlap count of two may signify that the pixels in the "x" and "y" coordinate in both drawing sheets 10 have a non-white color.

Referring back to FIGS. 3A-3B, in some embodiments, the number of categories may correspond to the number of drawing sheets 10 reviewed in a drawing set, such as, for example, ranging from about one to about one million, and particularly about one thousand. In the example, about ten drawing sheets 10 are included in a drawing set such that eleven categories (e.g., zero, one, two, three, four, five, six, seven, eight, nine, and ten) are formed.

As described in detail above, the information 28 in one or more of the plurality of cells 26 of a drawing sheet 10 may include substantially similar content across one or more drawing sheets 10 of a drawing set. Accordingly, and as seen in FIG. 3B, the pixel overlap count of the cell 26 may include a greater number of pixel locations having an overlap of ten (i.e., a greater number of pixel locations having a pixel overlap count of ten), and a smaller number of pixel locations having an overlap of zero or one (i.e., a smaller number of pixel locations having a pixel overlap count of zero or one), relative to those of the second target cell 32. In contrast, the information 28 in the first target cell 30 and/or the second target cell 32 of a drawing sheet 10 may include varying content across the one or more drawing sheets 10 in a drawing set. As such, and as seen in FIG. 3A, the pixel overlap count of the second target cell 32 may include a smaller number of pixel locations having an overlap of ten (i.e., a smaller number of pixel locations having a pixel overlap count of ten), and a greater number of pixel locations having an overlap of zero or one (i.e., a greater number of pixel locations having a pixel overlap count of zero or one), relative to those of the cell 26. As described further herein, the document review application 100 may be configured and operable to measure the pixel overlap count for each pixel in each of the plurality of cells 26, the first target cells 30, and the second target cells 32 of the plurality of drawing sheets 10 in a drawing set.

In addition to measuring a pixel overlap count for the plurality of cells 26, first target cells 30, and second target cells 32 in the drawing sheet 10, the document review application 100 may be configured and operable to determine a spatial pattern of the plurality of pixel locations having an intensity value (i.e., the information 28) on each of the drawing sheets 10 of a drawing set. The plurality of pixel locations having an intensity value in each of the plurality of cells 26 (e.g., the information 28) may generally have a regular and/or consistent spatial pattern relative to one another across a plurality of drawing sheets 10 in the same drawing set. Further, the plurality of pixel locations having an intensity value in the first target cell 30 (e.g., the sheet number) and the second target cell 32 (e.g., the sheet title) may generally have an irregular and/or varying spatial pattern relative to one another across a plurality of drawing sheets 10 in a single drawing set.

Figure 4A:
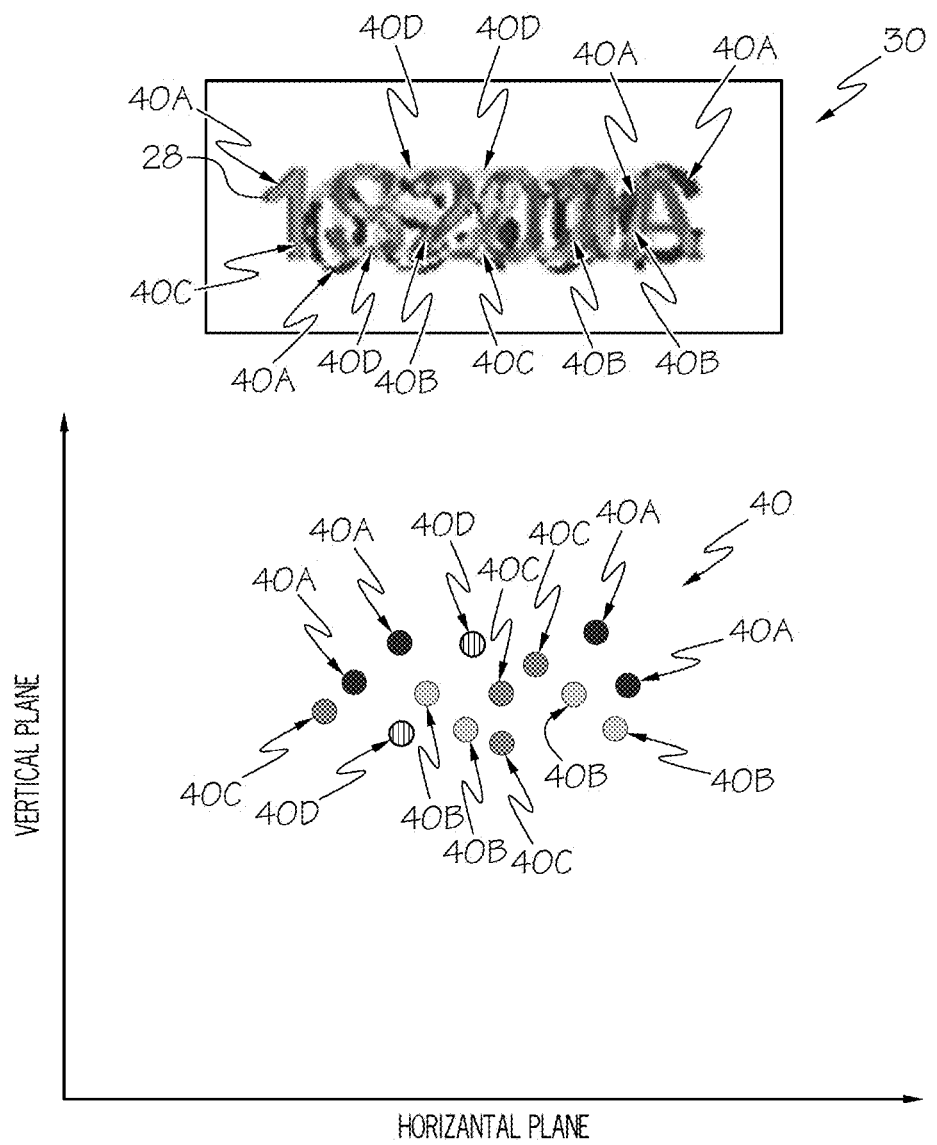
FIGS. 4A-4B show a graphical representation of a pixel layout for cells in the title box of the drawing sheet of FIG. 2, according to one aspect of the present disclosure.
Figure 4B:
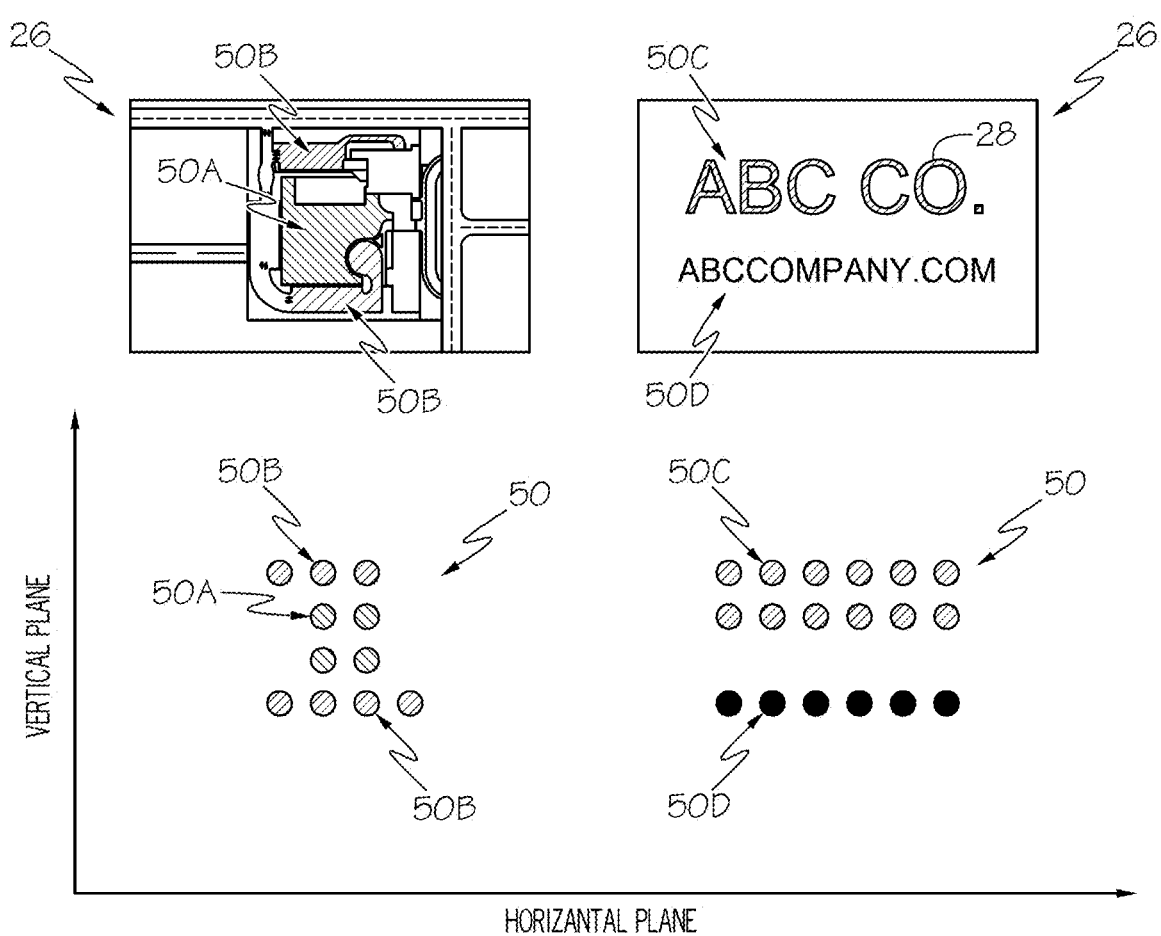

For example, FIGS. 4A-4B illustrate a visual depiction of the information 28 contained across a plurality of drawing sheets 10 in a drawing set at the first target cell 30 and two of the plurality of cells 26, one cell including an image and another cell including text. Stated differently, the information 28 included in the first target cell 30 and two of the plurality of cells 26 from a plurality of drawing sheets 10 in a drawing set is schematically depicted, with the information 28 from each drawing sheet 10 overlapping with one another, respectively. As described above, the model training component 110 may be configured to generate an overlap image of the plurality of cells 26 and target cells 30, 32 from the plurality of drawing sheets 10 in a drawing set, thereby depicting a comprehensive visual representation of the information 28 included in each cell relative to one another in the overlap image.

FIGS. 4A-4B further illustrate a respective graphical representation of the plurality of pixel locations including the information 28 for each of the visual depictions of the first target cell 30 and the cells 26. In the example, the graphical representations depict a horizontal plane and a vertical plane of the drawing sheet 10 in each of the first target cell 30 and the cells 26. The horizontal and vertical planes may define a spatial relationship corresponding to a location of the pixels that have an intensity value in the first target cell 30 and the cells 26 across the plurality of drawing sheets 10 in a drawing set.

As described in detail above, the information 28 in the first target cell 30 and/or the second target cell 32 of a drawing sheet 10 may include varying content across the one or more drawing sheets 10 in a drawing set. As such, and as seen in FIG. 4A, the spatial pattern of the pixel locations of the first target cell 30 may include an irregular and/or varying position 40 relative to one another along the horizontal and vertical planes. Further, in addition to depicting the irregular spatial pattern 40 of the pixels of the first target cell 30, data indicative of the pixel overlap count at each pixel location may be generated via a corresponding color. As briefly described above, varying colors of each pixel may be associated with a pixel overlap count for each of the plurality of pixel locations along the drawing sheet 10, such as at the first target cell 30.

By way of illustrative example, FIG. 4A depicts a graphical representation of the plurality of pixels in the first target cell 30 in the irregular spatial pattern 40, with at least a first portion of the pixels having a first color 40A, a second portion of the pixels having a second color 40B, a third portion of the pixels having a third color 40C, and a fourth portion of the pixels having a fourth color 40D. It should be appreciated that each of the first color 40A, the second color 40B, the third color 40C, and the fourth color 40D are schematically depicted with a distinctive shading, pattern, stippling, and/or hatching to clearly illustrate the varying colors of each of the plurality of pixels relative to one another. It should further be understood that additional and/or fewer colors may be included across the plurality of pixels in the first target cell 30 (and the other plurality of cells 26) dependent on an overlap count at said pixel location.

As further seen in FIG. 4A, a schematic depiction of the first target cell 30 is shown with the information 28 from each of the plurality of drawing sheets 10 overlapped atop one another. In this instance, the information 28 may be illustrated with colors to represent the overlap count at said area within the first target cell 30. As described in further detail herein, a white color area within the first target cell 30, and a white color pixel in the corresponding graphical representation of the plurality of pixels in the first target cell 30, may represent an empty area across the plurality of drawing sheets 10. The first color 40A, second color 40B, third color 40C, and fourth color 40D may represent an area and corresponding pixel location having a non-white color to varying degrees (e.g., pixel overlap count).

For example, the first color 40A may signify areas having a pixel overlap count of about 76% or more (as a percentage of the total drawing sheets 10 overlapped over one another); the second color 40B may signify areas having a pixel overlap count between about 51% to 75%; the third color 40C may signify areas having a pixel overlap count between about 26% to 50%; and the fourth color 40D may signify areas having a pixel overlap count between about 1% to 25%. It should be appreciated that the values shown and described herein are merely illustrative, and that various other suitable values for the pixel overlap count may be incorporated without departing from a scope of this disclosure.

In contrast, the information 28 in one or more of the plurality of cells 26 of a drawing sheet 10 may include substantially similar content across the drawing sheets 10 of a drawing set. Accordingly, and as seen in FIG. 4B, the spatial pattern of the pixel locations of the cells 26 may include a regular and/or consistent position 50 relative to one another along the horizontal and vertical planes. As described further herein, the document review application 100 may be configured and operable to measure the spatial pattern of each of the plurality of cells 26, the first target cells 30, and the second target cells 32 of the plurality of drawing sheets 10 in a drawing set. As further seen in FIG. 4B, data indicative of the pixel overlap count at each pixel location may be further generated via a corresponding color signifying the pixel overlap count for each pixel location along the cell 26.

By way of illustrative example, FIG. 4B depicts a graphical representation of the plurality of pixels in the cells 26 in the regular spatial pattern 50, with at least a first portion of the pixels having a first color 50A, a second portion of the pixels having a second color 50B, a third portion of the pixels having a third color 50C, and a fourth portion of the pixels having a fourth color 50D. Each of the first color 50A, the second color 50B, the third color 50C, and the fourth color 50D are schematically depicted with a distinctive shading, pattern, stippling, and/or hatching to clearly illustrate the varying colors of each of the plurality of pixels relative to one another. A pair of cells 26 is shown with the information from each of the plurality of drawing sheets 10 overlapped atop one another. The information may be illustrated with colors to represent the overlap count at said area within the cells 26, with white color areas representing empty areas and the first color 50A, second color 50B, third color 50C, and fourth color 50D representing areas with varying degrees of non-white color (e.g., pixel overlap count).

Figure 5:
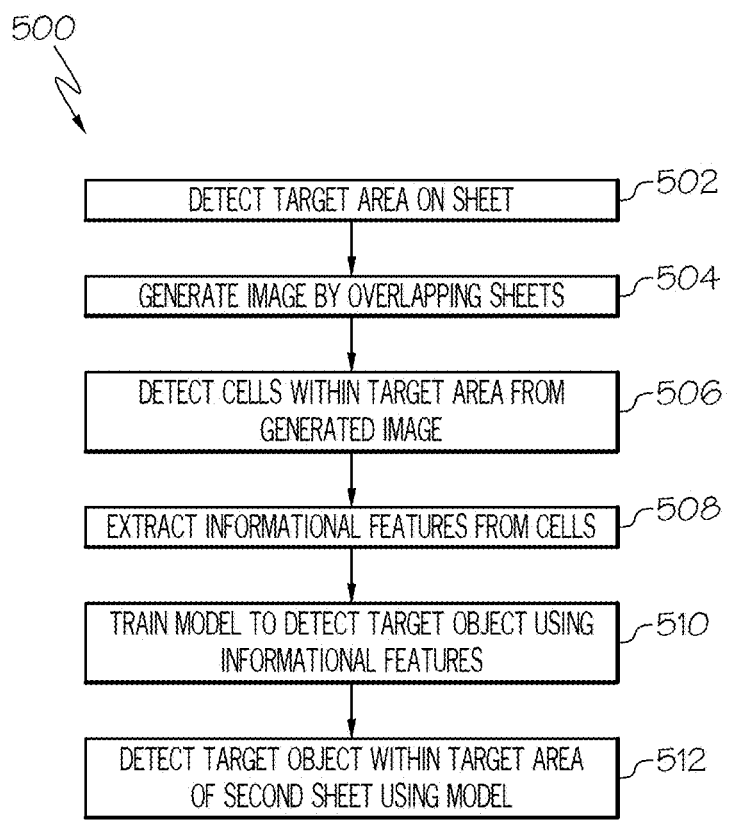
FIG. 5 is a flowchart illustrating an exemplary method of automatically detecting a target object on a drawing sheet, according to one aspect of the present disclosure.
Figure 6:
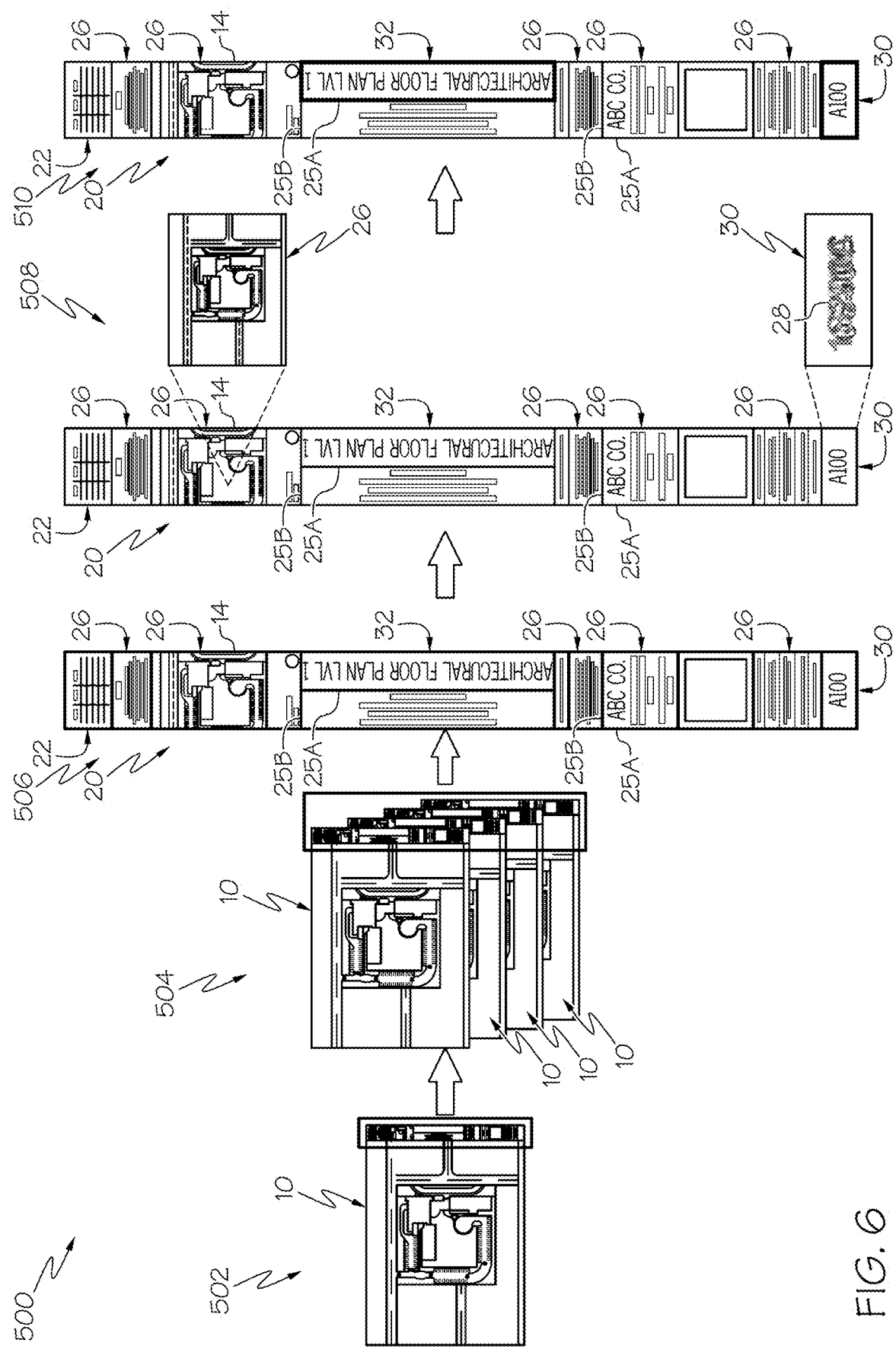
FIG. 6 shows a schematic depiction of the exemplary method of FIG. 5, according to one aspect of the present disclosure.

FIGS. 5 and 6 illustrate an exemplary method 500 of automatically detecting a target object (e.g., a cell containing a drawing title or a drawing number) on a drawing sheet, according to one aspect of the present disclosure. In general, the target object is detected by first training a machine learning model to determine a position of a target object in a drawing sheet using informational features extracted from a plurality of drawing sheets (i.e., sample drawing sheets) in a drawing set, and using the trained machine learning model to detect a target object from sheets in another drawing set. The method 500 may be performed by the model training component 110 and the model implementation component 160 of the document review application 100. In particular, steps 502-508 may describe data gathering and preparation phases, step 510 may describe a machine learning model training phase, and step 512 may describe the machine learning model application phase.

Initially at step 502 of FIGS. 5-6, and referring back to FIG. 2, the model training component 110 may scan one or more of the drawing sheets 10 in the drawing set to determine a location of a target area (i.e., a sample target area) (e.g., the title box 20). The model training component 110 may initially detect one or more long vertical lines 22 and/or long horizontal lines 24 within a predefined distance 34 from at least one of the terminal sides of the drawing sheet 10. The model training component 110 may be configured to distinguish the long vertical lines 22 and/or long horizontal lines 24 from one or more other lines on the drawing sheet 10 (e.g., short vertical lines 25A, short horizontal lines 25B, illustrative lines within center region 16, etc.) by determining a longitudinal length of the long vertical lines 22 and/or long horizontal lines 24 is substantially similar to a length of the adjacent terminal side of the drawing sheet 10.

In some embodiments, the predefined distance 34 may be selectively adjustable by a user, administrator, or developer of the model training component 110. In the example, the predefined distance 34 may include an offset distance from a terminal side of the drawing sheet 10 that equates to a range of about 8% to about 15% of the total surface area of the drawing sheet 10. Upon detecting one of the long vertical line 22 and the long horizontal line 24 as being present within the predefined distance 34 from a corresponding terminal side of the drawing sheet 10, the model training component 110 may determine the target area is located at said terminal side. In some embodiments, the drawing sheet 10 may omit any long vertical line 22 and long horizontal line 24 within the predefined distance 34 of at least one terminal side. In this instance, the model training component 110 may be configured to detect information 28 (e.g., textual characters) within the predefined distance of at least one terminal side of the drawing sheet 10 to determine the target area (e.g., the title box 20).

In certain instances, the drawing sheet 10 may include at least one long vertical line 22 within the predefined distance of the right terminal side 14, and at least one long horizontal line 24 within the predefined distance of the bottom terminal side 12. In this instance, the model training component 110 may be configured to determine which of the long vertical line 22 and long horizontal line 24 includes a higher ratio of surface area between the vertical line 22, 24 and the corresponding terminal side 14, 12, respectively. In other words, in the example of FIG. 2, the model training component 110 may determine that the long vertical line 22 may include a greater offset separation from the right terminal side 14 than the offset separation between the long horizontal line 24 and the bottom terminal side 12. Accordingly, the model training component 110 may detect the target area (e.g., the title box 20) as being positioned along the right terminal side 14 of the drawing sheet 10.

At step 504 of FIGS. 5-6, the model training component 110 may be configured to generate an overlap image from the plurality of drawing sheets 10 (i.e., sample drawing sheets) in the drawing set. For example, the plurality of drawing sheets 10 may be overlapped with one another to generate a digital representation (e.g., the overlap image) of the comprehensive contents of the drawing sheets 10 (e.g., the center region 16, the title box 20, etc.) on a single graphical plane. As described in detail above, the overlap image may include data indicative of a pixel overlap count for each of the plurality of pixel locations along the drawing sheets 10. For example, the color of each pixel in the overlap image may be defined by the number of pixel overlaps across the drawing sheets 10 at that pixel's location, such as, for example, from blue for a pixel overlap count of one to red for a pixel overlap count of ten. Therefore, a change of color from blue to red may correspond to an overlap ranging from one to ten. In one embodiment, the plurality of drawing sheets 10 may include the drawing sheet 10 from which the target area was detected at step 502.

At step 506 of FIGS. 5-6, the model training component 110 may be configured to detect the plurality of cells 26, the first target cell 30, and the second target cell 32 within the target area (e.g., the title box 20) detected at step 502. The plurality of cells 26, the first target cell 30, and the second target cell 32 may be detected by determining the one or more short vertical lines 25A and the short horizontal lines 25B positioned between the long vertical line 22 and the right terminal side 14. It should be appreciated that a combination of the short vertical lines 25A, the short horizontal lines 25B, the long vertical line 22, and/or the right terminal side 14 may collectively define the plurality of cells 26, the first target cell 30, and the second target cell 32. It should be understood that a space defined by and between the short vertical lines 25A, the short horizontal lines 25B, the long vertical line 22, and/or the right terminal side 14 may include the cells 26, the first target cell 30, and the second target cell 32.

At step 508 of FIGS. 5-6, the model training component 110 may be configured to extract the information 28 from the plurality of cells 26, the first target cell 30, and the second target cell 32 from the title box 20 of each of the plurality of drawing sheets 10. In particular, a plurality of features of the information 28 included in each of the cells 26, first target cell 30, and second target cell 32 (detected at step 506) from within the title box 20 (detected at step 502) may be extracted from the overlap image (generated at step 504). Step 508, and/or the steps prior to Step 508, may also involve labeling the data (e.g., features) extracted from the drawing sheets 10. Features such as the pixel overlap count, the spatial pattern arrangement, a cell size, and more may be extracted from the information 28 illustrated on the overlap image.

In the example, the drawing set may include ten drawing sheets 10, such that the model training component 110 may extract at least eleven features from the pixel overlap count (e.g., eleven categories ranging from zero pixel overlap count to ten pixel overlap count) for each of the plurality of cells 26, first target cell 30, and second target cell 32. Further, the model training component 110 may extract at least ten features from the spatial pattern arrangement of the pixel locations for each of the plurality of cells 26, first target cell 30, and second target cell 32. The model training component 110 may further extract a cell size for each of the plurality of cells 26, first target cell 30, and second target cell 32. The cell size may be determined based on a vertical length and a horizontal length of the cells. Accordingly, the model training component 110 may extract at least two features from the cell size, one for each of the vertical length and horizontal length.

As described in detail above, and referring back to FIGS. 3A-3B, the first target cell 30 and the second target cell 32 may include a greater ratio of pixels having a pixel overlap count of zero or one than the plurality of cells 26. Further, the plurality of cells 26 may include a greater ratio of pixels having a pixel overlap count of ten than the first target cell 30 and the second target cell 32. Accordingly, the model training component 110 may be configured to determine a location of the first target cell 30 and the second target cell 32 within the title box 20 based at least partially on the pixel overlap count.

It should be appreciated that the first target cell 30 and the second target cell 32 may include a greater diversity (i.e., disbursement) of pixel overlap counts between the plurality of pixel overlap count categories (e.g., zero to ten) than the cells 26. This may be based on the variance in the information 28 included in the first target cell 30 (e.g., sheet number) and the second target cell 32 (e.g., sheet title) across the plurality of drawing sheets 10, as compared to the substantially similar information 28 included in the cells 26 across the drawing sheets 10.

As described in detail above, and referring back to FIGS. 4A-4B, the location of the plurality of pixels within the first target cell 30 and the second target cell 32 may show a greater disparity across the plurality of drawing sheets 10. Further, the location of the plurality of pixels within the plurality of cells 26 may show a lower or minimal disparity across the plurality of drawing sheets 10. Accordingly, the model training component 110 may be configured to determine a location of the first target cell 30 and the second target cell 32 within the title box 20 based at least partially on the spatial pattern arrangement.

It should be appreciated that the locations of the plurality of pixels within the first target cell 30 and the second target cell 32 may have a greater randomness (i.e., spatial irregularity relative to one another) than the cells 26. This may be based on the variance in the information 28 included in the first target cell 30 (e.g., sheet number) and the second target cell 32 (e.g., sheet title) across the plurality of drawing sheets 10, as compared to the substantially similar information 28 included in the cells 26 across the drawing sheets 10.

In some examples, the model training component 110 may be configured to determine a pixel (positioning) randomness of each of the plurality of pixels in the cells 26, first target cell 30, and second target cell 32 of the title box 20 by executing one or more tests, such as, for example, Wald-Wolfowitz Runs test. In this instance, a non-parametric statistical test may be executed by the model training component 110 to determine a randomness of each of the pixel locations in the cells 26, first target cell 30, and second target cell 32 based on a two-valued data sequence. For example, the model training component 110 may determine the randomness of a pixel location by measuring instances in which the pixel location changes from not including an intensity value (e.g., a value of zero) to including an intensity value (e.g., a value of one) across the plurality of drawing sheets 10. In one embodiment, about ten features may be related to a pixel's randomness.

The cell size of the plurality of cells 26, first target cell 30, and second target cell 32 may be determined based on a vertical length and a horizontal length of the cells. The model training component 110 may be configured to determine the vertical length and horizontal length based on one or more features, such as, for example, a length of the one or more short vertical lines 25A and/or short horizontal lines 25B that define a boundary of the cell. The model training component 110 may further determine the vertical length and horizontal length based on a cumulative length of the pixel locations having an intensity value. In other words, a vertical length of the information 28 included in the cell may be determined by the model training component 110 to correspond to the vertical length of the cell, and a horizontal length of the information 28 in the cell may correspond to the horizontal length of the cell.

In one embodiment, one or more of the vertical length and/or horizontal length of the plurality of pixels within the first target cell 30 and the second target cell 32 may be greater across the title box 20 of each of the plurality of drawing sheets 10 than the cells 26. Accordingly, the cells in the title box 20 with pixel locations having an intensity value with the two greatest vertical lengths and horizontal lengths may be determined as the first target cell 30 and the second target cell 32. Accordingly, the model training component 110 may be configured to determine a location of the first target cell 30 and the second target cell 32 within the title box 20 based at least partially on the sizes of the cells in the title box 20. In one embodiment, about two features may be related to a cell's size.

At step 510 of FIGS. 5-6, the model training component 110 may train a machine learning model to detect a target area (i.e., a sample target area) of drawing sheets 10 (i.e., sample drawing sheets) using the informational features extracted from the plurality of cells 26, first target cells 30, and second target cells 32 of the plurality of drawing sheets 10 (step 508). In particular, the machine learning model may be trained to detect one or more target objects (e.g., first target cell 30, second target cell 32, etc.) within the target area.

At step 512, the model implementation component 160 may be configured to extract features from cells in a second drawing sheet of a target drawing set using the same techniques or techniques similar to steps 502, 504, 506, 508 discussed above, and employ the trained machine learning model (step 510) to process the features and detect one or more target objects (e.g., cells containing a sheet title and a sheet number) in the second drawing sheet. Therefore, a "machine learning model" as used herein may receive and process data (e.g., extracted information features) for classification, as an example. Further, as used herein, a "machine learning model" is a model configured to receive input (e.g., extracted information features), and apply one or more of a weight, bias, classification, or analysis on the input to generate an output. The output may include, for example, a classification of the input (e.g., classification results indicative of which cells correspond to target objects, reflected by probabilities determined for the cells), an analysis based on the input, design, process, prediction, or recommendation associated with the input, or any other suitable type of output. In one embodiment, the machine learning model used in the context of the present disclosure may be a decision tree model, but other models suitable for the disclosed implementations may also be used, which will be further described below.

Once the target object, such as, for example, a cell containing a sheet number and a cell containing a sheet title, have been detected, the model implementation component 160 may extract the sheet number and title from the detected target objects. If the second drawing sheet was in a vector format, such as, e.g., a PDF, the text corresponding to the sheet number and title may be extracted by inserting all of the vector text in the drawing sheet into a spatial indexing data structure, and querying for text within the detected target objects. If no such text is found, optical character recognition technique may be used on a raster rendering of the drawing sheet within the detected target objects.

A machine learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine learning model may operate on an input linearly, in parallel, via a network (e.g., a neural network), or via any suitable configuration.

The execution of the machine learning model may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

In some embodiments, the model trained by the model training component 110 may include using a "base" or standard machine learning algorithm or technique, and adapting it based on the information features extracted from the one or drawing sheets 10. In such embodiments, a model including a base machine learning algorithm or technique configured to detect a location of a target object (e.g., sheet title, sheet number, etc.) may be trained by the model training component 110 (e.g., step 510 of method 500). Examples of suitable base machine learning algorithms or techniques include gradient boosting machine (GBM) techniques, or random forest techniques.

Unless specifically stated otherwise, as apparent from the following discussions, it is appreciated that throughout the specification discussions utilizing terms such as "processing," "computing," "calculating," "determining," "analyzing," "identifying" or the like, refer to the action and/or processes of a computer or computing system, or similar electronic computing device, that manipulate and/or transform data represented as physical, such as electronic, quantities into other data similarly represented as physical quantities. In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

Figure 7:
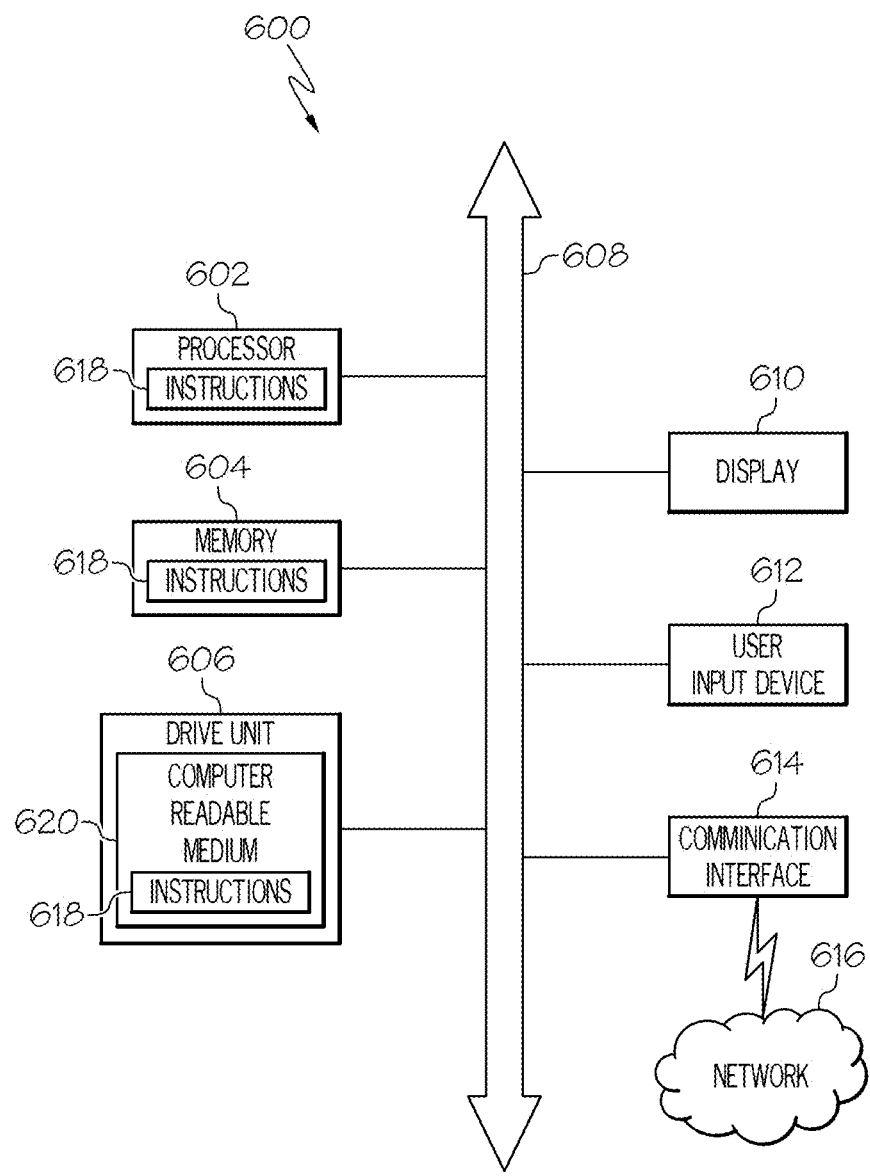
FIG. 7 illustrates an implementation of a computer system that may execute techniques presented herein.

FIG. 7 illustrates an implementation of a computer system designated 600. The computer system 600 may include a set of instructions that can be executed to cause the computer system 600 to perform any one or more of the methods or computer based functions disclosed herein (e.g., steps discussed in reference to FIG. 5). The computer system 600 may operate as a standalone device or may be connected, e.g., using a network, to other computer systems or peripheral devices.

In a networked deployment, the computer system 600 may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 600 may be implemented using electronic devices that provide voice, video, or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 7, the computer system 600 may include a processor 602, e.g., a central processing unit (CPU), a graphics processing unit (GPU), or both. The processor 602 may be a component in a variety of systems. For example, the processor 602 may be part of a standard personal computer or a workstation. The processor 602 may be one or more general processors, digital signal processors, application specific integrated circuits, field programmable gate arrays, servers, networks, digital circuits, analog circuits, combinations thereof, or other now known or later developed devices for analyzing and processing data. The processor 602 may implement a software program, such as code generated manually (i.e., programmed).

The computer system 600 may include a memory 604 that can communicate via a bus 608. The memory 604 may be a main memory, a static memory, or a dynamic memory. The memory 604 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 604 includes a cache or random-access memory for the processor 602. In alternative implementations, the memory 604 is separate from the processor 602, such as a cache memory of a processor, the system memory, or other memory.

The memory 604 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 604 is operable to store instructions executable by the processor 602. The functions, acts or tasks illustrated in the figures or described herein may be performed by the programmed processor 602 executing the instructions stored in the memory 604. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 600 may further include a display 610, such as a liquid crystal display (LCD), an organic light emitting diode (OLED), a flat panel display, a solid-state display, a cathode ray tube (CRT), a projector, a printer or other now known or later developed display device for outputting determined information. The display 610 may act as an interface for the user to see the functioning of the processor 602, or specifically as an interface with the software stored in the memory 604 or in the drive unit 606.

Additionally or alternatively, the computer system 600 may include an input device 612 configured to allow a user to interact with any of the components of system 600. The input device 612 may be a number pad, a keyboard, or a cursor control device, such as a mouse, or a joystick, touch screen display, remote control, or any other device operative to interact with the computer system 600.

The computer system 600 may also or alternatively include a disk or optical drive unit 606. The disk drive unit 606 may include a computer-readable medium 620 in which one or more sets of instructions 618, e.g. software, can be embedded. Further, the instructions 618 may embody one or more of the methods or logic as described herein. The instructions 618 may reside completely or partially within the memory 604 and/or within the processor 602 during execution by the computer system 600. The memory 604 and the processor 602 also may include computer-readable media as discussed above.

In some systems, a computer-readable medium 620 includes instructions 618 or receives and executes instructions 618 responsive to a propagated signal so that a device connected to a network 616 can communicate voice, video, audio, images, or any other data over the network 616. Further, the instructions 618 may be transmitted or received over the network 616 via a communication port or interface 614, and/or using a bus 608. The communication port or interface 614 may be a part of the processor 602 or may be a separate component. The communication port 614 may be created in software or may be a physical connection in hardware. The communication port 614 may be configured to connect with a network 616, external media, the display 610, or any other components in computer system 600, or combinations thereof. The connection with the network 616 may be a physical connection, such as a wired Ethernet connection or may be established wirelessly as discussed below. Likewise, the additional connections with other components of the computer system 600 may be physical connections or may be established wirelessly. The network 616 may alternatively be directly connected to the bus 608.

While the computer-readable medium 620 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 620 may be non-transitory, and may be tangible.

The computer-readable medium 620 can include a solid-state memory such as a memory card or other package that houses one or more non-volatile read-only memories. The computer-readable medium 620 can be a random-access memory or other volatile re-writable memory. Additionally or alternatively, the computer-readable medium 620 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 600 may be connected to one or more networks 616. The network 616 may define one or more networks including wired or wireless networks. The wireless network may be a cellular telephone network, an 802.11, 802.16, 802.20, or WiMax network. Further, such networks may include a public network, such as the Internet, a private network, such as an intranet, or combinations thereof, and may utilize a variety of networking protocols now available or later developed including, but not limited to TCP/IP based networking protocols. The network 616 may include wide area networks (WAN), such as the Internet, local area networks (LAN), campus area networks, metropolitan area networks, a direct connection such as through a Universal Serial Bus (USB) port, or any other networks that may allow for data communication. The network 616 may be configured to couple one computing device to another computing device to enable communication of data between the devices. The network 616 may generally be enabled to employ any form of machine-readable media for communicating information from one device to another. The network 616 may include communication methods by which information may travel between computing devices. The network 616 may be divided into sub-networks. The sub-networks may allow access to all of the other components connected thereto or the sub-networks may restrict access between the components. The network 616 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosed embodiments are not limited to any particular implementation or programming technique and that the disclosed embodiments may be implemented using any appropriate techniques for implementing the functionality described herein. The disclosed embodiments are not limited to any particular programming language or operating system.

It should be appreciated that in the above description of exemplary embodiments, various features of the present disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed embodiment requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the disclosed techniques.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments, those skilled in the art will recognize that other and further modifications may be made thereto without departing from the spirit of the present disclosure, and it is intended to claim all such changes and modifications as falling within the scope of the present disclosure. For example, any formulas and/or tests given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for detecting a target object on a document page, the method comprising:
    detecting a sample target area on a sample document page by detecting (i) a line within a predetermined distance from at least one of a first terminal side or a second terminal side of the sample document page and (ii) one or more textual characters positioned adjacent to the line, wherein the predetermined distance corresponds to a ratio of a total surface area of the sample document page;
    generating an image by overlapping a plurality of sample document pages with one another;
    detecting one or more cells within the sample target area on the image, wherein the sample target area includes a sample target object;
    extracting one or more informational features from each of the one or more cells, wherein the one or more informational features define characteristics of a corresponding cell of the one or more cells;
    training a machine learning model, using the one or more informational features extracted from each of the one or more cells, to detect the sample target object; and
    detecting the target object on the document page using the trained machine learning model.

2. The computer-implemented method of claim 1, wherein the ratio includes 8% to 15% of the total surface area of the sample document page.

3. The computer-implemented method of claim 1, wherein detecting the sample target area on the sample document page by detecting the line within the predetermined distance from at least one of the first terminal side or the second terminal side of the sample document page comprises:
    detecting a first line within the predetermined distance from the first terminal side of the sample document page;
    detecting a second line within the predetermined distance from the second terminal side of the sample document page;
    determining a first offset distance between the first line and the first terminal side;
    determining a second offset distance between the second line and the second terminal side; and
    comparing the first offset distance and the second offset distance.

4. The computer-implemented method of claim 3, wherein detecting the sample target area on the sample document page by detecting the one or more textual characters positioned adjacent to the line comprises:
    determining the first offset distance is greater than the second offset distance; and
    detecting the one or more textual characters positioned adjacent to the first line upon determining the first offset distance is greater than the second offset distance.

5. The computer-implemented method of claim 1, wherein detecting the sample target area on the sample document page by detecting (i) the line within the predetermined distance from at least one of the first terminal side or the second terminal side of the sample document page and (ii) the one or more textual characters positioned adjacent to the line comprises:

detecting zero lines within the predetermined distance from the first terminal side and the second terminal side of the sample document page; and detecting the one or more textual characters positioned adjacent to at least one of the first terminal side or the second terminal side and within the predetermined distance.

6. The computer-implemented method of claim 1, wherein generating the image by overlapping the plurality of sample document pages comprises:

determining a pixel overlap count for each of a plurality of locations along a surface of each of the plurality of sample document pages.

7. The computer-implemented method of claim 6, wherein extracting the one or more informational features from each of the one or more cells comprises:

determining the pixel overlap count for each of at least a subset of the plurality of locations positioned within each of the one or more cells; and assigning one or more groupings to each of the one or more cells based on the pixel overlap count for each of at least the subset of the plurality of locations positioned within the one or more cells, such that locations having the same pixel overlap count are assigned to the same grouping.

8. The computer-implemented method of claim 7, wherein extracting the one or more informational features from each of the one or more cells further comprises:

determining a size ratio of each of the one or more groupings; and using the size ratio of each grouping as part of the one or more informational features.

9. The computer-implemented method of claim 7, wherein extracting the one or more informational features from each of the one or more cells further comprises:

determining a randomness of each of at least the subset of the plurality of locations positioned within each or the one or more cells; and using the randomness of each location as part of the one or more informational features.

10. The computer-implemented method of claim 1, wherein extracting the one or more informational features from each of the one or more cells comprises:

determining a width of each of the one or more cells;
determining a height of each of the one or more cells; and
determining a size of each of the one or more cells based on the width and the height of the one or more cells.

11. The computer-implemented method of claim 10, wherein extracting the one or more informational features from each of the one or more cells further comprises:

using the size of each cell as part of the one or more informational features.

12. A system for detecting a target object on a document page, comprising:

one or more processors; and
at least one non-transitory computer readable medium storing instructions which, when executed by the one or more processors, cause the one or more processors to perform operations comprising:

detecting a sample target area on a sample document page by detecting (i) a line within a predetermined distance from at least one of a first terminal side or a second terminal side of the sample document page and (ii) one or more textual characters positioned adjacent to the line, wherein the predetermined distance corresponds to a ratio of a total surface area of the sample document page;

generating an image by overlapping a plurality of sample document pages with one another;

detecting one or more cells within the sample target area on the image, wherein the sample target area includes a sample target object;

extracting one or more informational features from each of the one or more cells, wherein the one or more informational features define characteristics of a corresponding cell of the one or more cells;

training a machine learning model, using the one or more informational features extracted from each of the one or more cells, to detect the sample target object; and detecting the target object on the document page using the trained machine learning model.

13. The system of claim 12, wherein generating the image by overlapping the plurality of sample document pages with one another comprises:

determining a pixel overlap count for each of a plurality of locations along a surface of each of the plurality of sample document pages; and generating at least one color on the image at each of the plurality of locations, wherein the at least one color corresponds to the pixel overlap count at each of the plurality of locations.

14. The system of claim 12, wherein the ratio includes 8% to 15% of the total surface area of the sample document page.

15. The system of claim 12, wherein detecting the one or more cells within the sample target area on the image comprises:

detecting one or more of a first line and a second line within the sample target area having a predetermined thickness; and detecting the first line and the second line intersect with one another within the sample target area.

16. The system of claim 12, wherein the sample document page includes a drawing, the sample target area includes a title box on the drawing, and the sample target object includes a title or a sheet number in the title box.

17. At least one non-transitory computer readable medium for automatically detecting a target object on a document page, the at least one non-transitory computer readable medium storing instructions which, when executed by one or more processors, cause the one or more processors to perform operations comprising:

detecting a sample target area on a sample document page by detecting (i) a line within a predetermined distance from at least one of a first terminal side or a second terminal side of the sample document page and (ii) one or more textual characters positioned adjacent to the line, wherein the predetermined distance corresponds to a ratio of a total surface area of the sample document page;

generating an image by overlapping a plurality of sample document pages with one another;

detecting one or more cells within the sample target area on the image, wherein the sample target area includes a sample target object;

extracting one or more informational features from each of the one or more cells, wherein the one or more informational features define characteristics of a corresponding cell of the one or more cells;

training a machine learning model, using the one or more informational features extracted from each of the one or more cells, to detect the sample target object; and detecting the target object on the document page using the trained machine learning model.

* * * * *